(12) United States Patent
Wang (10) Patent No.: US 12,523,782 B2
(45) Date of Patent: Jan. 13, 2026

(54) ULTRA WIDE-LANE (UWL) AMBIGUITY TO IDENTIFY PRECISE POSITIONING ENGINE (PPE) CORRECTION EXCEPTIONS

(71) Applicant: QUALCOMM Incorporated, San Diego, CA (US)

(72) Inventor: Min Wang, Tustin, CA (US)

(73) Assignee: QUALCOMM Incorporated, San Diego, CA (US)

( * ) Notice: Subject to any disclaimer, the term of this patent is extended or adjusted under 35 U.S.C. 154(b) by 313 days.

(21) Appl. No.: 18/467,000

(22) Filed: Sep. 14, 2023

(65) Prior Publication Data

US 2025/0093526 A1    Mar. 20, 2025

(51) Int. Cl.
*G01S 19/41*      (2010.01)
*G01S 19/44*      (2010.01)

(52) U.S. Cl.
CPC .............. *G01S 19/41* (2013.01); *G01S 19/44* (2013.01)

(58) Field of Classification Search
CPC .......... G01S 19/41; G01S 19/44; G01S 19/77; G01S 19/258

USPC .......... 342/465, 457, 357.24, 357.41, 357.49
See application file for complete search history.

(56) References Cited

U.S. PATENT DOCUMENTS 10,422,885 B2 *   9/2019   Dai .................. G01S 19/44
2012/0154215 A1 *   6/2012   Vollath .............. G01S 19/04
                                            342/357.49

* cited by examiner

*Primary Examiner* — Bo Fan
(74) *Attorney, Agent, or Firm* — Weaver Austin Villenueve & Sampson LLP (57) ABSTRACT

A global navigation satellite system (GNSS) device may receive GNSS correction data from a correction data source and obtain a first carrier-phase measurement of a first GNSS signal having a first carrier frequency, and a second carrier-phase measurement of a second GNSS signal having a second carrier frequency. The GNSS device may apply the GNSS correction data to the first carrier-phase measurement, the second carrier-phase measurement, or both. The GNSS device may, subsequent to applying the GNSS correction data, perform a wide-lane (WL) combination of the first carrier-phase measurement and the second carrier-phase measurement and determine whether the GNSS correction data includes an error based at least in part on whether a difference between a float ambiguity value for the WL combination and a closest integer exceeds a threshold value.

30 Claims, 8 Drawing Sheets

|  | $L_i$ | $L_j$ | WL wavelen (m) | Amplify scale | Est. WL Noise/MP (m) |
|---|---|---|---|---|---|
| GPS | L1 | L2 | 0.86 | 5.74 | 0.12 |
| | L1 | L5 | 0.75 | 4.93 | 0.11 |
| | L2 | L5 | 5.86 | 33.24 | 0.83 |
| GAL | E1 | E5A | 0.75 | 4.93 | 0.11 |
| | E1 | E5B | 0.81 | 5.39 | 0.12 |
| | E1 | E5abAltBoc | 0.78 | 5.15 | 0.11 |
| | E1 | E6 | 1.01 | 6.84 | 0.14 |
| | E5B | E5A | 9.77 | 54.92 | 1.38 |
| | E5abAltBoc | E5A | 19.54 | 109.13 | 2.76 |
| | E6 | E5A | 2.93 | 16.99 | 0.41 |
| | E5B | E5abAltBoc | 19.54 | 110.55 | 2.76 |
| | E6 | E5B | 4.19 | 24.56 | 0.59 |
| | E6 | E5abAltBoc | 3.45 | 20.10 | 0.49 |
| BDS | B1C | B1I | 20.93 | 154.86 | 2.96 |
| | B1icAltBoc | B1I | 41.86 | 309.01 | 5.92 |
| | B1I | B2a | 0.78 | 5.08 | 0.11 |
| | B1I | B2b | 0.85 | 5.58 | 0.12 |
| | B1I | B2abAltBoc | 0.81 | 5.32 | 0.11 |
| | B1I | B3 | 1.02 | 6.88 | 0.14 |
| | B1C | B1icAltBoc | 41.86 | 310.42 | 5.92 |
| | B1C | B2a | 0.75 | 4.93 | 0.11 |
| | B1C | B2b | 0.81 | 5.39 | 0.12 |
| | B1C | B2abAltBoc | 0.78 | 5.15 | 0.11 |
| | B1C | B3 | 0.98 | 6.59 | 0.14 |
| | B1icAltBoc | B2a | 0.77 | 5.00 | 0.11 |
| | B1icAltBoc | B2b | 0.83 | 5.48 | 0.12 |
| | B1icAltBoc | B2abAltBoc | 0.80 | 5.23 | 0.11 |
| | B1icAltBoc | B3 | 1.00 | 6.73 | 0.14 |
| | B2b | B2a | 9.77 | 54.92 | 1.38 |
| | B2abAltBoc | B2a | 19.54 | 109.13 | 2.76 |
| | B3 | B2a | 3.26 | 18.79 | 0.46 |
| | B2b | B2abAltBoc | 19.54 | 110.55 | 2.76 |
| | B3 | B2b | 4.88 | 28.53 | 0.69 |
| | B3 | B2abAltBoc | 3.91 | 22.69 | 0.55 |

ULTRA WIDE-LANE (UWL) AMBIGUITY TO IDENTIFY PRECISE POSITIONING ENGINE (PPE) CORRECTION EXCEPTIONS

BACKGROUND

1. Field of Disclosure

The present disclosure relates generally to the field of satellite-based positioning, and more specifically to Global Navigation Satellite Systems (GNSS) positioning.

2. Description of Related Art

Precise positioning techniques such as real-time kinematic (RTK) and precise point positioning (PPP) can enhance the precision of a position estimate obtained by a Global Navigation Satellite Systems (GNSS) receiver. The sub-meter-level position estimates that precise positioning can provide typically exceed the accuracy of traditional consumer-grade GNSS receivers. Thus, precise positioning can increase the number of applications that consumer-grade GNSS receivers may be used for. However, the correction data used to provide this precise positioning may sometimes have errors that can prevent a GNSS receiver from obtaining a precise position estimate.

BRIEF SUMMARY

An example method of identifying an error in global navigation satellite system (GNSS) correction data for precise positioning of a GNSS device, according to this disclosure, may comprise receiving, at the GNSS device, the GNSS correction data from a correction data source. The method also may comprise obtaining, using a multi-band GNSS receiver of the GNSS device: a first carrier-phase measurement of a first GNSS signal having a first carrier frequency, and a second carrier-phase measurement of a second GNSS signal having a second carrier frequency. The method also may comprise applying the GNSS correction data to the first carrier-phase measurement, the second carrier-phase measurement, or both. The method also may comprise, subsequent to applying the GNSS correction data, performing a wide-lane (WL) combination of the first carrier-phase measurement and the second carrier-phase measurement. The method also may comprise determining whether the GNSS correction data includes an error based at least in part on whether a difference between a float ambiguity value for the WL combination and a closest integer exceeds a threshold value.

An example global navigation satellite system (GNSS) device comprising: a multi-band GNSS receiver, one or more memories, one or more processors communicatively coupled with the multi-band GNSS receiver and the one or more memories, wherein the one or more processors are configured to receive GNSS correction data from a correction data source. The one or more processors further may be configured to obtain, using the multi-band GNSS receiver: a first carrier-phase measurement of a first GNSS signal having a first carrier frequency, and a second carrier-phase measurement of a second GNSS signal having a second carrier frequency. The one or more processors further may be configured to apply the GNSS correction data to the first carrier-phase measurement, the second carrier-phase measurement, or both. The one or more processors further may be configured to, subsequent to applying the GNSS correction data, perform a wide-lane (WL) combination of the first carrier-phase measurement and the second carrier-phase measurement. The one or more processors further may be configured to determine whether the GNSS correction data includes an error based at least in part on whether a difference between a float ambiguity value for the WL combination and a closest integer exceeds a threshold value.

An example apparatus for identifying an error in global navigation satellite system (GNSS) correction data for precise positioning of a GNSS device, according to this disclosure, may comprise means for receiving the GNSS correction data from a correction data source. The apparatus further may comprise means for obtaining: a first carrier-phase measurement of a first GNSS signal having a first carrier frequency, and a second carrier-phase measurement of a second GNSS signal having a second carrier frequency. The apparatus further may comprise means for applying the GNSS correction data to the first carrier-phase measurement, the second carrier-phase measurement, or both. The apparatus further may comprise subsequent to applying the GNSS correction data, performing a wide-lane (WL) combination of the first carrier-phase measurement and the second carrier-phase measurement. The apparatus further may comprise means for determining whether the GNSS correction data includes an error based at least in part on whether a difference between a float ambiguity value for the WL combination and a closest integer exceeds a threshold value.

According to this disclosure, an example non-transitory computer-readable medium stores instructions for identifying an error in global navigation satellite system (GNSS) correction data for precise positioning of a GNSS device, the instructions comprising code for receiving, at the GNSS device, the GNSS correction data from a correction data source. The instructions further may comprise code for obtaining, using a multi-band GNSS receiver of the GNSS device: a first carrier-phase measurement of a first GNSS signal having a first carrier frequency, and a second carrier-phase measurement of a second GNSS signal having a second carrier frequency. The instructions further may comprise code for applying the GNSS correction data to the first carrier-phase measurement, the second carrier-phase measurement, or both. The instructions further may comprise code for subsequent to applying the GNSS correction data, performing a wide-lane (WL) combination of the first carrier-phase measurement and the second carrier-phase measurement. The instructions further may comprise code for determining whether the GNSS correction data includes an error based at least in part on whether a difference between a float ambiguity value for the WL combination and a closest integer exceeds a threshold value.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used, and various modifications may be made without departing from the scope of the disclosure.

As used herein, the terms "position" and "location" are used interchangeably. Further, terms such as "position estimate," "position determination," "position fix," "location estimate," "estimated location," "location fix," and the like are also used interchangeably herein with regard to Global Navigation Satellite Systems (GNSS)-based positioning to refer to an estimated position of a mobile device or other device comprising a GNSS receiver. The position or location may be a two-dimensional position, e.g., with regard to a two-dimensional map, or a three-dimensional position.

As used herein, a "positioning engine" refers to one or more components (e.g., software components or modules) that perform positioning techniques to determine a position estimate of a mobile device. In a typical embodiment, a positioning engine for a mobile device is executed by one or more processors of the mobile device. A positioning engine that provides high-precision positioning (also referred to herein as a "Precise Positioning Engine (PPE)") generally operates by obtaining pseudorange and carrier phase GNSS data from radio frequency (RF) signals from one or more GNSS constellations, and further applying correction data obtained from a correction data source to apply various corrections to the GNSS data to further determine a precise position. More particularly, positioning by a PPE uses carrier-phase-based ranging by determining the number of carrier frequency cycles between a satellite and mobile device (e.g., carrier phase measurements, including changes in phase and the number of cycles of the carrier signals).

A positioning engine may use, for example, a Bayesian estimator to determine one or more high-precision positions of a mobile device. Examples of Bayesian estimators that may be used include a Kalman Filter, an Extended Kalman Filter, an Unscented Kalman Filter, a particle filter, or the like. It should be noted that, as used herein, "Kalman Filter" is intended to refer to various types of Kalman Filters, such as an Extended Kalman Filter, an Unscented Kalman Filter, or the like. In some embodiments, an estimator may be used to iteratively determine states that correspond to a predicted device location over a series of time steps. Continuing with this example, the Bayesian estimator may be iteratively updated (e.g., states of the estimator may be iteratively updated) to identify a solution. The solution of the estimator may correspond to a high-precision GNSS-based position estimate of a mobile device at a time point at which the estimator has converged.

As previously noted, a GNSS receiver (e.g., at a vehicle, mobile device, etc.) may be capable of determining a high-precision position estimate using a high-precision positioning technique such as RTK or PPP. These high-precision position techniques involve the GNSS receiver receiving correction data from an RTK or PPP service and using a precise positioning engine (PPE) to apply the correction data to GNSS measurements by the GNSS receiver to obtain a position accuracy far greater than traditional (pseudorange-based) GNSS position. However, sometimes correction data received from an RTK or PPP service may have errors. These "exceptions" in the correction data (also referred to herein as "PPE correction exceptions" or "correction exceptions") may not be easily identified and prevent the PPE from converging on a high-precision solution.

Various aspects of the embodiments described herein relate generally to high-precision positioning using a PPE. Some aspects specifically provide techniques for identifying such correction exceptions. In some examples, a wide lane (WL) (e.g., ultra-wide lane (UWL)) combination of different GNSS bands may be performed to determine a float ambiguity term using one or more techniques. Such techniques may include, for example, solving a geometry component with a PPE float solution and/or taking a difference between wide lane carrier phase and narrow lane pseudorange values. Once a float ambiguity term is determined, it may then be used to identify a potential PPE correction exception. According to some embodiments, once identified, a PPE correction exception can be omitted from data used to determine an ambiguity term for the PPE position estimate, enabling the PPE to provide a high-precision position estimate.

Particular aspects of the subject matter described in this disclosure can be implemented to realize one or more of the following potential advantages. In some examples, by using a wide lane combination to determine a float ambiguity term, the described techniques can be used to identify a correction exception very quickly, with a relatively low cost in terms of power in processing. A person of ordinary skill in the art will appreciate these and other advantages in view of the embodiments provided below. Detailed embodiments are provided after a brief discussion of relevant technology. It can be noted that, although embodiments herein discuss solutions as applied to RTK, embodiments are not so limited. Embodiments may be used for other precise positioning solutions, including PPP for example.

Figure 1:
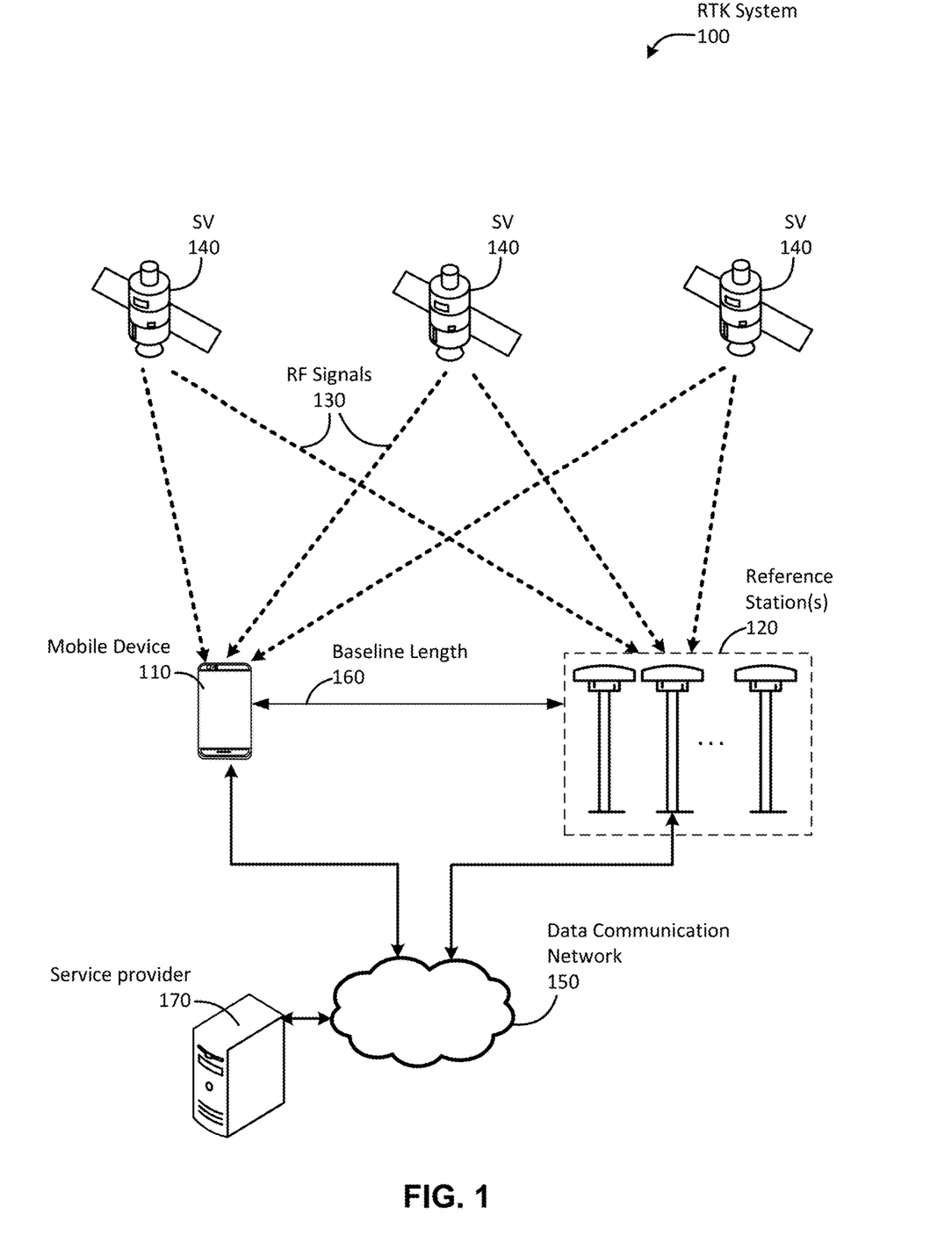
FIG. 1 is a simplified diagram of a Real-Time Kinematic (RTK) system, according to an embodiment.

FIG. 1 is a simplified diagram of an RTK system, according to an embodiment. As noted, RTK system 100 enables a highly accurate (e.g., sub-meter) GNSS position fix of a mobile device 110 (also known as a "rover station" or "rover") by using GNSS receivers at both the mobile device 110 and one or more reference stations 120 (also known as "base stations") that receive radio frequency (RF) signals 130 from satellite vehicles (SVs) 140 (GNSS satellites) from one or more GNSS constellations (e.g., Global Position System (GPS), Galileo (GAL), GLONASS, Beidou (BDS), etc.). Types of mobile devices 110 used may vary, depending on the application, and may include any of a variety of types of devices having access to GNSS positioning data, such as mobile devices equipped with GNSS receivers. As indicated previously, such mobile devices may include consumer electronics or other mobile consumer devices, such as a mobile phone, tablet, laptop, wearable device, tracking device, vehicle, or the like. In some embodiments, the mobile device 110 may comprise industrial equipment, such as survey equipment.

In traditional GNSS-based positioning, the mobile device 110 can use code-based positioning to determine a distance of each of the SVs 140 based on a determined delay in a generated pseudorandom binary sequence received in the RF signals 130. RF signals 130 may be transmitted on different carrier frequencies, and a mobile device 110 may use RF signals 130 on multiple carrier frequencies to increase the accuracy of a position fix. In GPS, the carrier frequencies include L1 with a frequency of 1.5754 GHz and a wavelength of 0.1903 m, L2 with a frequency of 1.2276 GHz and a wavelength of 0.2442 m, and L5 with a frequency of 1.1765 GHz and a wavelength of 0.2548 m. Other GNSS constellations have different sets of carrier frequencies. The mobile device 110 can accurately calculate the location of each SV 140 at a specific moment in time using ephemeris (or navigation) data regarding the SVs 140. With the distance and location information of the SVs 140, the mobile device 110 can then determine a position fix for its location using traditional GNSS techniques.

This position fix may be determined, for example, by a Standalone Positioning Engine (SPE) executed by one or more processors of the mobile device 110. However, the resulting accuracy of the position fix for mobile device 110 is subject to errors caused by SV 140 orbit and clock, ionosphere and troposphere delays, and other phenomena. Although this can provide accuracy on the order of meters, this accuracy may be insufficient for many applications.

The RTK system 100 can support RTK-based positioning and can provide a position fix with much higher accuracy than traditional GNSS-based positioning (e.g., on the order of centimeters or decimeters) by using carrier-based ranging based on the carrier wave of the RF signals 130. RTK positioning can use a reference station 120 to make measurements of RF signals 130 with a highly accurate GNSS receiver from a known location. RTK correction data (also known as "RTK service data") includes highly accurate carrier-based ranging, which may be provided to a service provider 170 and relayed to the mobile device 110 via radio broadcasts and/or data communication network 150 (e.g., the Internet). The mobile device 110 can then use the RTK correction data to correct errors in its own carrier-based ranging using measurements of the RF signals 130 from its own GNSS receiver. Error correction for RTK positioning can include correction of satellite clock and orbit, ionospheric and tropospheric delays, phase wind-up, and site displacement including solid earth tide, ocean loading, and/or pole tide. This more accurate position fix (i.e., position) may be determined, for example, by a Precise Positioning Engine (PPE) executed by one or more processors of the mobile device 110. More specifically, in addition to the information provided to an SPE, the PPE may use RTK correction data, to provide a high-accuracy, carrier-based position fix. Several GNSS techniques can be adopted in PPE, including RTK and/or other techniques such as Differential GNSS (DGNSS) and Precise Point Positioning (PPP). The accuracy of the RTK-based position fix for the mobile device 110 can depend on its distance, or baseline length 160, from the reference station 120; the accuracy of the differential corrections; and the like. Although traditional RTK correction has been limited to a baseline length 160 on the order of kilometers or tens of kilometers, new techniques may extend the baseline length 160 to far greater distances using enhanced techniques for error correction.

RTK positioning may involve using network-based techniques. In network-based RTK, correction data from a plurality of reference stations 120 is sent to a service provider 170. The mobile device 110 can then receive on-demand RTK correction data by sending a request to the service provider 170, including an approximate location of the mobile device 110 (e.g., based on a previously-known position, non-GNSS-based positioning (such as a tracking area in a wireless communications network or dead reckoning-based positioning of a vehicle), etc.). The service provider 170, which may comprise one or more computer servers, can then provide customized RTK service data for the mobile device 110 by interpolating the correction data from the plurality of reference stations 120 to provide RTK correction data for the approximate location of the mobile device 110.

As noted, to determine an RTK-based position estimation, a mobile device 110 can use a location/position estimator or positioning engine (e.g., PPE) based on a Kalman Filter, Weighted Least Squares (WLS), a particle filter, or the like, to determine a position estimation that incorporates ambiguity resolution and differential correction. A location/position estimator or positioning engine is typically updated every measurement cycle, or epoch, which is typically once per second. During each cycle, embodiments may employ two phases of computation for each measurement epoch: a prediction phase and an update phase. Additionally, the location/position estimator of the mobile device 110 may predict and update its estimated position and a predicted estimated covariance (often simply called the covariance or estimate covariance), representing the estimated accuracy of the estimated position.

As noted, devices may utilize a PPE to provide high-precision positioning using RTK (or PPP) correction information. RTK derives correction information from differential GNSS readings between a target device (or "rover station") and one or more local base stations. Benefits include simple error modeling computation and better performance on error canceling. The drawbacks of RTK, however, include the need for local or regional reference stations and a larger bandwidth requirement relative to PPP.

Figure 2:
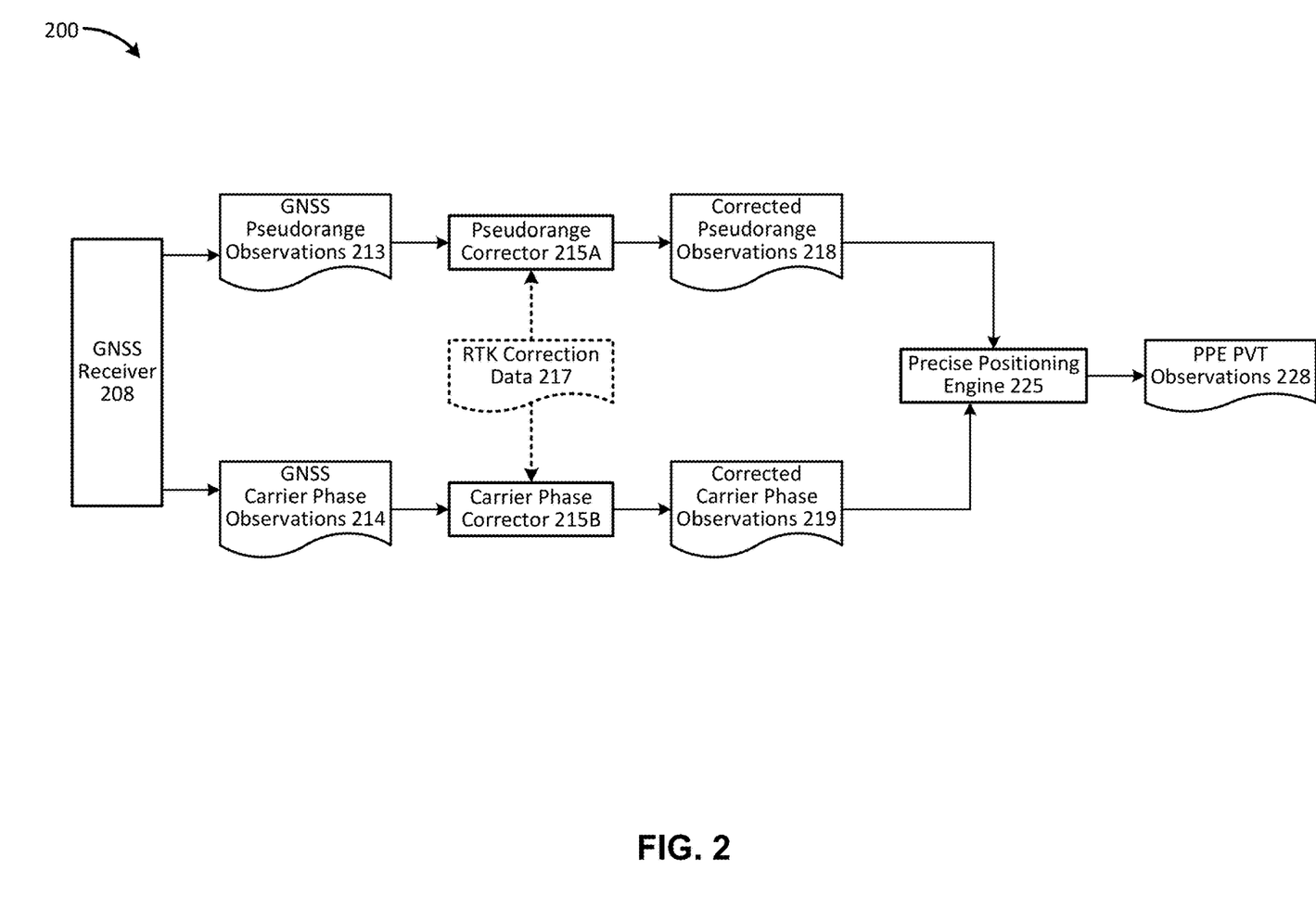
FIG. 2 is a block diagram illustrating an example RTK positioning scheme, according to aspects of the disclosure.
Figure 8:
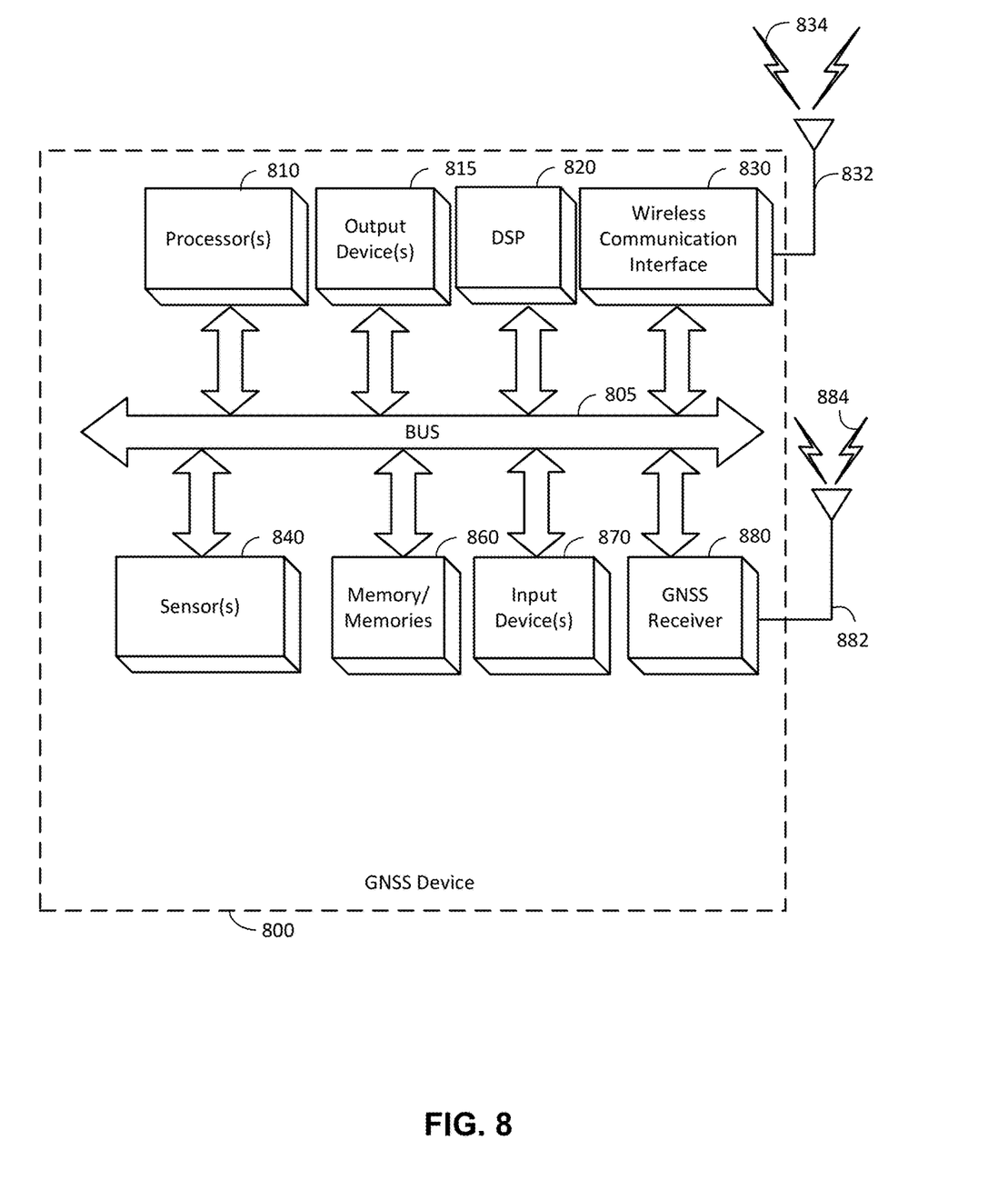
FIG. 8 is a block diagram of a GNSS device, according to an embodiment.

FIG. 2 is a block diagram illustrating an example RTK positioning scheme 200, according to aspects of the disclosure. In some embodiments, the various blocks may be implemented by software and/or hardware components of a positioning engine, which may be integrated into the mobile device for which positioning is determined. (Example components of a mobile device are shown in FIG. 8, which is described in detail hereafter.)

According to positioning scheme 200, a GNSS receiver 208 measures GNSS signals to obtain GNSS pseudorange observations 213 and GNSS carrier phase observations 214. In various examples, the GNSS receiver 208 may correspond to the mobile device 110 of FIG. 1 and/or may be incorporated into a mobile or other device (e.g., a mobile device as described herein). Based on RTK correction data 217, a pseudorange corrector 215A corrects GNSS pseudorange observations 213 to obtain corrected pseudorange observations 218, and a carrier phase corrector 215B corrects GNSS carrier phase observations 214 to obtain corrected carrier phase observations 219. In various examples, the RTK correction data 217 may be representative of correction data provided by a correction service (e.g., RTK correction service). Based on corrected pseudorange observations 218 and corrected carrier phase observations 219, a PPE 225 generates PPE position, velocity, and time (PVT) observations 228.

Ambiguity resolution of carrier phase observations 214 (using carrier phase corrector 215B) involves solving for the unknown number of integer carrier cycles biasing a phase measurement. This is a part of the process by which the PPE 225 uses carrier phase measurements to produce a high-accuracy RTK positioning estimate (PPE PVT observations 228). Once the ambiguity is resolved (known as "ambiguity resolution" or "ambiguity fixing), a low-noise carrier phase measurement can be used as a range signal. Problematically, some RTK correction data can have errors that prevent ambiguity resolution. An example of one of these PPE correction exceptions is provided with respect to FIGS. 3A and 3B, described below.

Figure 3A:
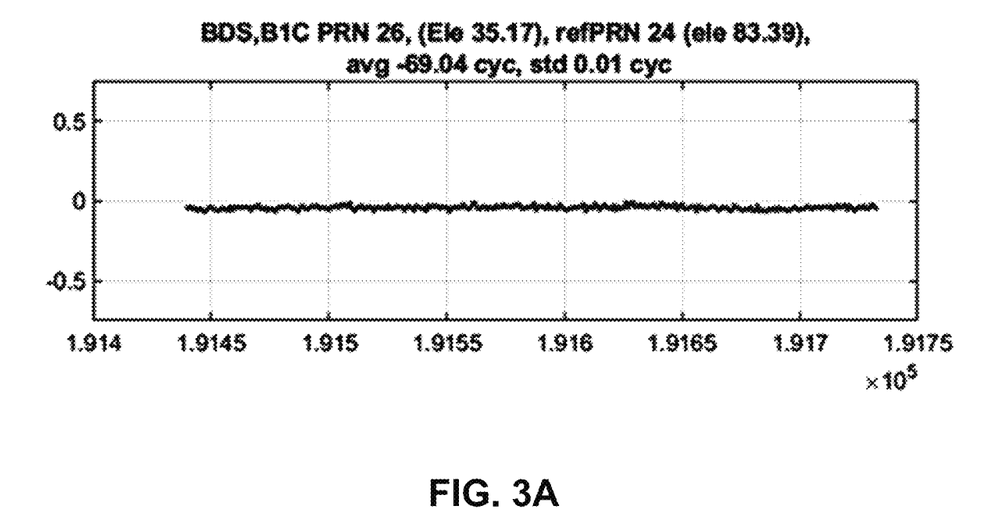
FIGS. 3A and 3B are example graphs plotting double-differenced ambiguity cycle offset of correction data for a particular Beidou Navigation Satellite System (BDS) satellite.

FIG. 3A is a graph in which a double-differenced ambiguity cycle offset of correction data for a particular Beidou Navigation Satellite System (BDS) satellite is plotted over the course of many epochs. This represents typical conditions, in which the cycle offset is close to zero, enabling ambiguity resolution to the integer. A PPE performing integer ambiguity resolution (IAR) can result in centimeter-level positioning accuracy and reduced convergence time. These advantages may be desirable in many applications including, for example, automotive platforms.

Figure 3B:
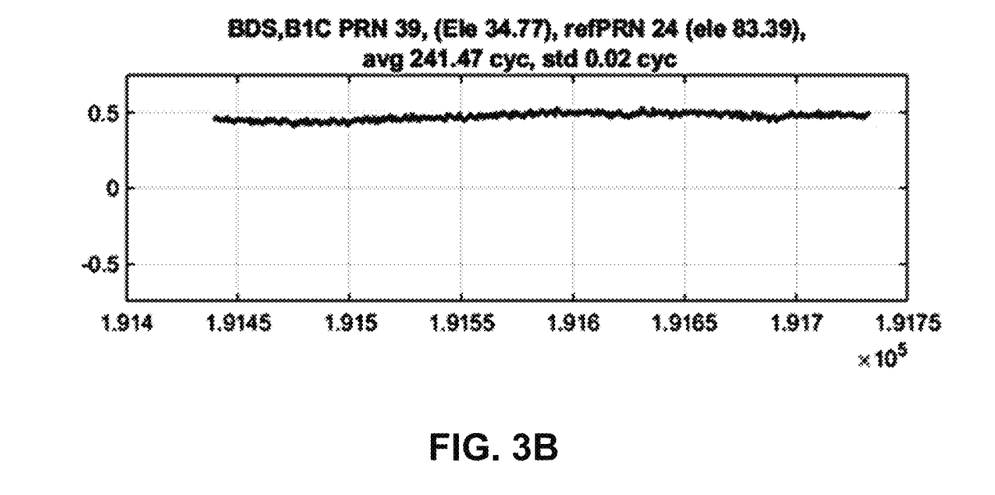

FIG. 3B is a graph, similar to FIG. 3A, in which a double-differenced ambiguity cycle offset of correction data for a BDS satellite is plotted over the course of many epochs. The graph in FIG. 3B, however, illustrates an exceptional case in which the double-differenced ambiguity includes a half-cycle offset. This can prevent a PPE from resolving an ambiguity term to the integer, which can result in the PPE engine failing to converge on a high-accuracy position estimate through integer ambiguity resolution. PPE correction exceptions such as these can be difficult to identify.

Embodiments herein address these and other issues by providing techniques for identifying such PPE correction exceptions. By using a WL combination of carrier-phase measurements of two GNSS carrier frequency bands to determine a float ambiguity term a PPE correction exception can be identified and omitted from data used to determine an ambiguity term for the PPE position estimate, enabling the PPE to provide a high-precision position estimate. Moreover, by using a WL combination (and in particular, UWL combination) the identification of such PPE correction exceptions can be done quickly, using relatively few computational resources. New tri-band, quad-band, and multi-band GNSS antennas can enable new WL frequency combinations to implement the embodiments described herein.

A WL combination is a combination of GNSS signals on two different GNSS carrier frequencies that result in an effective wavelength that is larger than the wavelength of either of the two GNSS carrier frequencies. For example, for two carrier frequencies Li and Lj, signals may be represented as:

$$\nabla \Delta \Phi_{Li} = \nabla \Delta \rho + \lambda_{Li} \cdot \nabla \Delta N_{Li} + \epsilon_{\nabla \Delta \Phi_{Li}}, \text{ and} \quad (1)$$

$$\nabla \Delta \Phi_{Lj} = \nabla \Delta \rho + \lambda_{Lj} \cdot \nabla \Delta N_{Lj} + \epsilon_{\nabla \Delta \Phi_{Lj}},$$

where $\Phi$ is carrier phase measurement in meters, $\nabla \Delta$ is the double-differencing operator, $\rho$ is the geometry range, N is the integer ambiguity, $\lambda$ is the signal wavelength in meters, and $\epsilon$ represents the signal noise/multipath for the signal. The WL combination of the two signals represented by equations (1) is then:

$$\nabla \Delta \Phi_{WL} = \frac{f_i}{f_i - f_j} \nabla \Delta \Phi_{Li} - \frac{f_j}{f_i - f_j} \nabla \Delta \Phi_{Lj} \quad (2)$$

$$= \nabla \Delta \rho + \lambda_{WL} \nabla \Delta N_{WL} + \epsilon_{\nabla \Delta \Phi_{WL}}.$$

The WL combination with an effective wavelength ($\lambda_{WL}$) that is larger than the wavelength of either of the two carrier frequencies ($\lambda_{Li}$ and $\lambda_{Lj}$). For RTK ambiguity fixing, the search space for the ambiguity term is inversely proportional to the wavelength. Thus, the WL combination drastically reduces the search space for the ambiguity term, making determining the WL ambiguity term $\nabla \Delta N_{WL}$ a relatively quick process. For UWL combinations (e.g., WL combinations in which the effective wavelength $\lambda_{WL}$ is greater than 3 m), the determination of the ambiguity term can be instantaneous (e.g., within one epoch).

Figure 4:
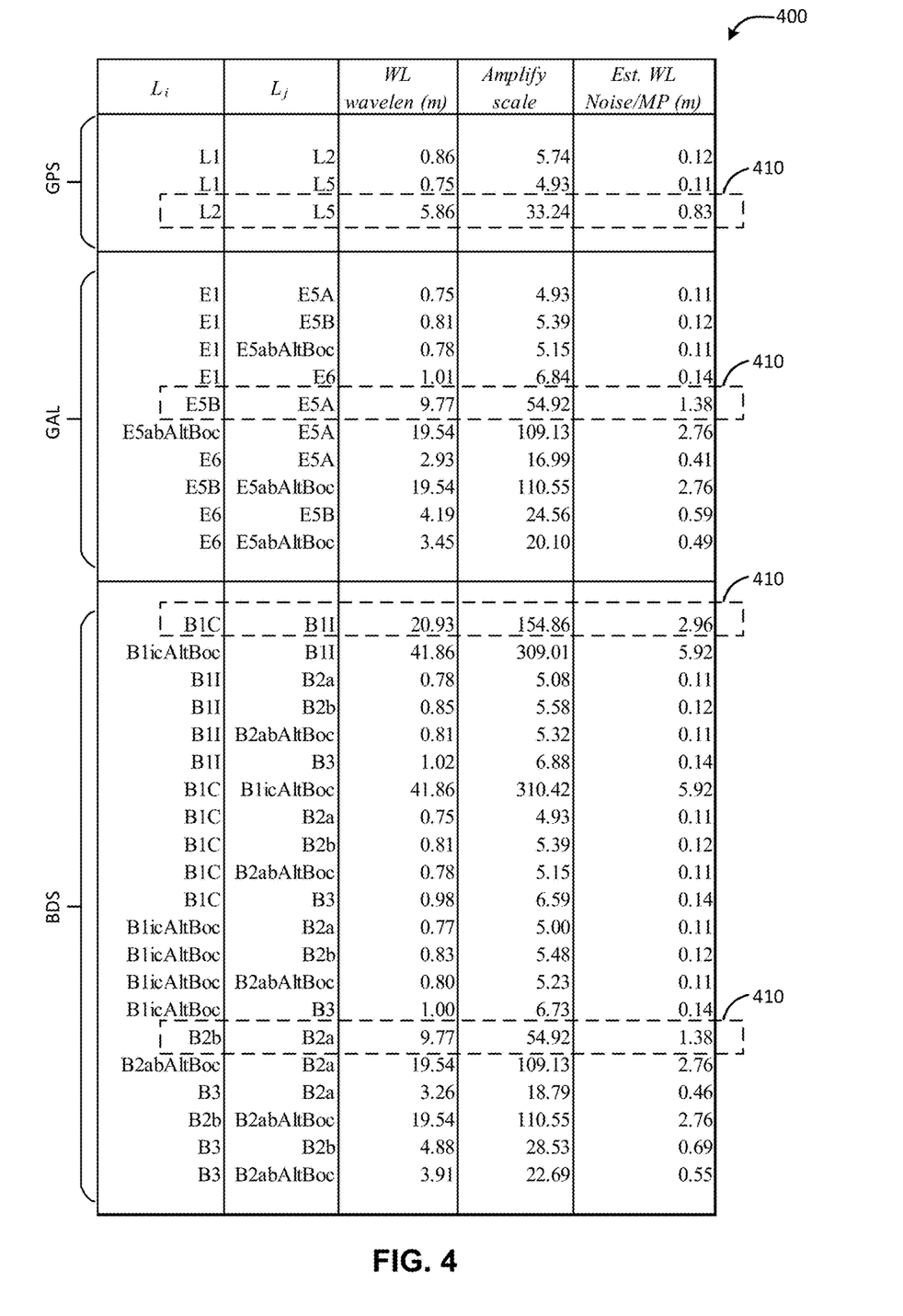
FIG. 4 is a table of properties of various wide-lane (WL) combinations, which may be used in some embodiments.

FIG. 4 is a table 400 of effective WL wavelength, scale factor (S), WL noise/multipath (NP), for various WL combinations calculated in the manner previously described. (WL noise/MP values in the last column reflect an STD value of 10% for a mobile platform.) WL combinations are made for the various carrier frequencies of GPS, Galileo (GAL), and Beidou (BDS). Similar calculations may be made for other GNSS systems/constellations. Further, the introduction of additional carrier frequencies within a constellation can result in additional possible combinations of carrier frequencies for UWL combinations as used by embodiments described herein.

As previously noted, embodiments can use UWL combinations to help ensure quick WL ambiguity resolution. The UWL combinations in blocks 410 are examples of such UWL combinations that may be available on certain platforms for implementing embodiments herein. That said, embodiments may utilize other WL combinations. Such WL combinations can be used to identify PPE correction exceptions using the method illustrated in FIG. 5.

Figure 5:
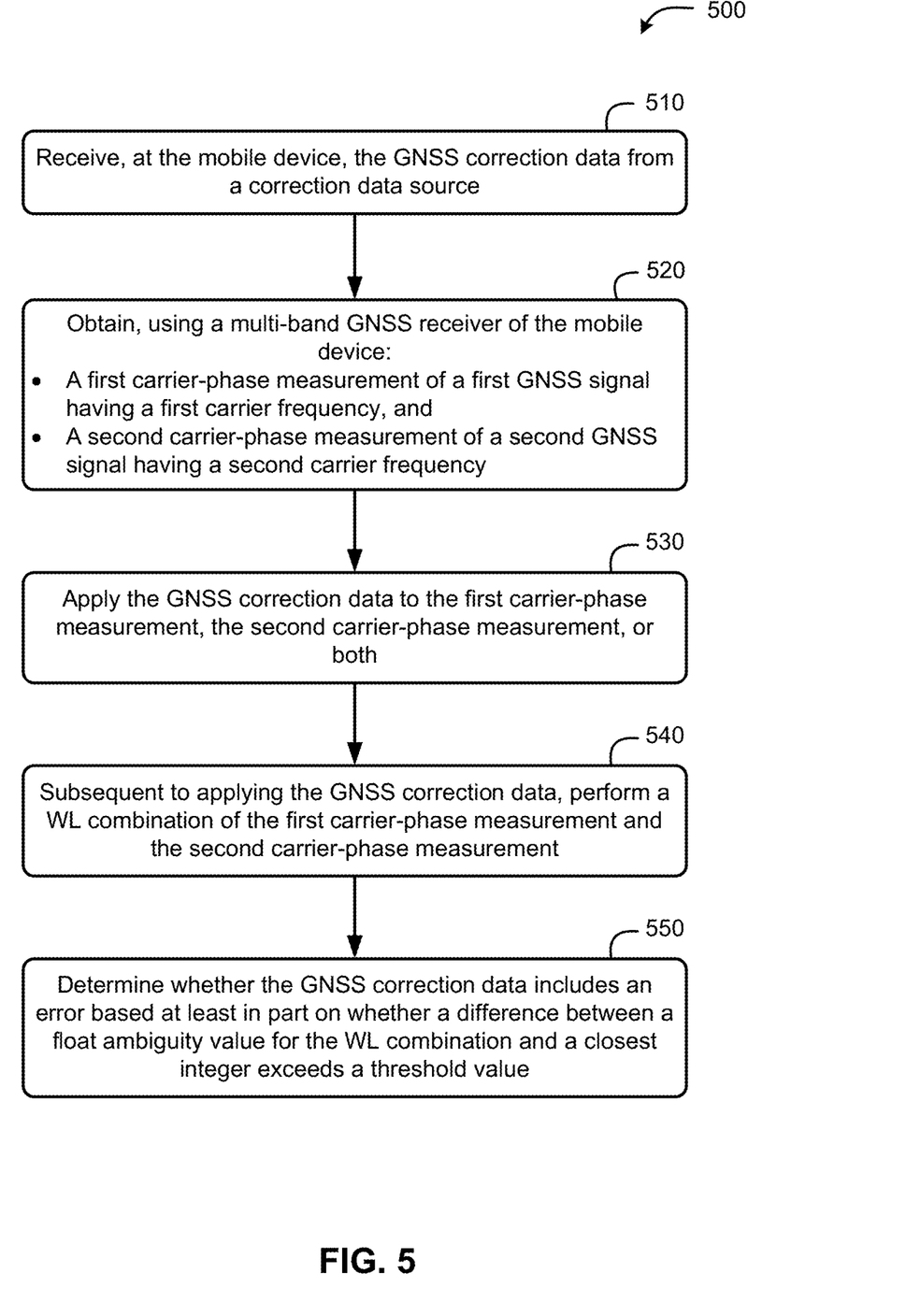
FIG. 5 is a flow diagram of a method of identifying an error in GNSS correction data (e.g., a PPE correction exception, as described herein), according to an embodiment.

FIG. 5 is a flow diagram of a method 500 of identifying an error in GNSS correction data (e.g., a PPE correction exception, as described herein), according to an embodiment. Means/structure for performing the functionality of one or more of the blocks of method 500 may comprise a PPE (e.g., PPE 225) which may be executed by one or more components of a mobile device. Example components of the mobile device are illustrated hereafter with respect to FIG. 8.

The functionality at block 510 comprises a receiving, at the mobile device, the GNSS correction data from a correction data source. As noted, GNSS correction data may comprise RTK correction data or PPP correction data, for example. As such, a correction data source may comprise an RTK service, a PPP service, etc. The mobile device may receive the correction data via a communication link with the source. This can include a wireless communication link (e.g., cellular, Wi-Fi, satellite, etc.) to one or more public and/or private networks, which may include the Internet. Means and/or structure for performing the functionality at block 510 may comprise, for example, a bus 805, one or more processors 810, a DSP 820, a wireless communication interface 830, a GNSS receiver 880, and/or other components of a GNSS device 800, as illustrated in FIG. 8 and described below.

The functionality at block 520 comprises obtaining, using a multi-band GNSS receiver of the mobile device: a first carrier-phase measurement of a first GNSS signal having a first carrier frequency, and a second carrier-phase measurement of a second GNSS signal having a second carrier frequency. More specifically, these measurements may be for the same time epoch, enabling a WL combination as described herein. Means and/or structure for performing the functionality at block 520 may comprise, for example, a bus 805, one or more processors 810, a DSP 820, a wireless communication interface 830, a GNSS receiver 880, and/or other components of a GNSS device 800, as illustrated in FIG. 8 and described below.

The functionality at block 530 comprises applying the GNSS correction data to the first carrier-phase measurement, the second carrier-phase measurement, or both. By applying the correction data, a subsequent WL combination and help identify whether the GNSS correction data has an error, as described below. Means and/or structure for performing the functionality at block 530 may comprise, for example, a bus 805, one or more processors 810, a DSP 820, a wireless communication interface 830, a GNSS receiver 880, and/or other components of a GNSS device 800, as illustrated in FIG. 8 and described below.

The functionality at block 540 comprises, subsequent to applying the GNSS correction data, performing a WL combination of the first carrier-phase measurement and the second carrier-phase measurement. As illustrated in FIG. 4, different WL combinations of carrier frequencies can result in different effective wavelengths and other features. WL combinations can be made, for example, using different carrier frequencies in the same GNSS system/constellation. In some embodiments, the WL combination of the method 500 may comprise a ultra-wide lane combination in which an effective wavelength of the UWL combination is greater than 3 m.

Means and/or structure for performing the functionality at block 540 may comprise, for example, a bus 805, one or more processors 810, a DSP 820, a wireless communication interface 830, a GNSS receiver 880, and/or other components of a GNSS device 800, as illustrated in FIG. 8 and described below.

The functionality at block 550 comprises determining whether the GNSS correction data includes an error based at least in part on whether a difference between a float ambiguity value for the WL combination and a closest integer exceeds a threshold value. That is, if a float ambiguity value for the WL combination is more than a threshold value from the closest integer (e.g., when the float ambiguity value is rounded up or down to the nearest integer), it can be determined that the GNSS correction data has an error (e.g., there is a PPE correction exception). Using the float WL ambiguity term $\nabla \Delta \hat{N}_{WL}$, this determination can be expressed mathematically as:

$$|\nabla \Delta \hat{N}_{WL} - \langle \nabla \Delta \hat{N}_{WL} \rangle| < T, \qquad (3)$$

where $\langle\ \rangle$ is the rounding operator, $|\ |$ is the operator to compute the absolute value, and T is the threshold value. According to some embodiments, the threshold value may be some value to distinguish between an integer value (0) and a non-integer solution (e.g., a half cycle error (0.5)) for the WL ambiguity term. As such, according to some embodiments, the threshold may comprise be set at the halfway point: 0.25. Alternative embodiments may use different thresholds, based on desired implementation (e.g., 0.15, 0.2, 0.3, 0.35, etc.). According to some embodiments, this threshold may depend, at least in part, on the effective wavelength of the WL combination. Depending on desired functionality, different techniques may be used to determine the float ambiguity value for the WL combination. Some examples are provided below.

Means and/or structure for performing the functionality at block 550 may comprise, for example, a bus 805, one or more processors 810, a DSP 820, a wireless communication interface 830, a GNSS receiver 880, and/or other components of a GNSS device 800, as illustrated in FIG. 8 and described below.

Depending on desired functionality, different techniques may be implemented to mitigate the impact of the erroneous GNSS correction data. As noted, PPE correction exceptions can prevent a PPE engine from resolving an ambiguity term. As such, the erroneous GNSS correction data may be excluded by the PPE from the ambiguity search for the precise positioning estimate of the GNSS device. That said, the erroneous GNSS correction data may still be useful, and still may be used for a float solution. Thus, some embodiments of the method 500 may comprise, responsive to determining that the GNSS correction data includes the error, determining a precise GNSS position estimate of the GNSS device without using the GNSS correction data to for ambiguity resolution.

Depending on factors such as how and where the PPE is implemented, the precise GNSS position estimate may be provided in different ways to different entities. Thus, some embodiments of the method 500 may further comprise outputting the precise GNSS position estimate of the GNSS device to an application, an operation system, a component of the GNSS device, a second device, or any combination thereof.

As noted above, with respect to determining the float ambiguity value for the WL combination, it may be done in any of a variety of ways. As a first example, determining the float ambiguity value for the WL combination may comprise solving a geometry component of the WL combination. For example, using equation (2) and ignoring the relatively small error from noise multipath, the float ambiguity value for the WL combination, $\nabla \Delta \hat{N}_{WL}$, can be determined as follows:

$$\nabla \Delta \hat{N}_{WL} = \frac{\nabla \Delta \Phi_{WL} - \nabla \Delta \rho}{\lambda_{WL}}, \qquad (4)$$

Where may be determined from the following equation.

As a second example, determining the float ambiguity value for the WL combination may comprise taking a difference between a carrier phase value of the WL combination and a narrow-lane (NL) pseudorange value. This can be done, for example, by substituting a double-differenced NL pseudorange value, $\nabla \Delta P_{NL}$ (which normally has a better quality than a pseudorange value on an individual band), for geometry value $\nabla \Delta \tilde{\rho}$ in equation (4), as follows:

$$\nabla\Delta\hat{N}_{WL} = \frac{\nabla\Delta\Phi_{WL} - \nabla\Delta P_{NL}}{\lambda_{WL}}. \quad (5)$$

As a person of ordinary skill in the art will appreciate, narrow-lane pseudorange value, $\nabla\Delta P_{NL}$, can be computed using double-differenced pseudorange values ($\nabla\Delta P$) as follows:

$$\nabla\Delta P_{NL} = \frac{f_i}{f_i - f_j}\nabla\Delta P_{Li} + \frac{f_j}{f_i + f_j}\nabla\Delta P_{Lj} = \nabla\Delta\rho + \epsilon_{\nabla\Delta P_{NL}}. \quad (6)$$

Figure 6:
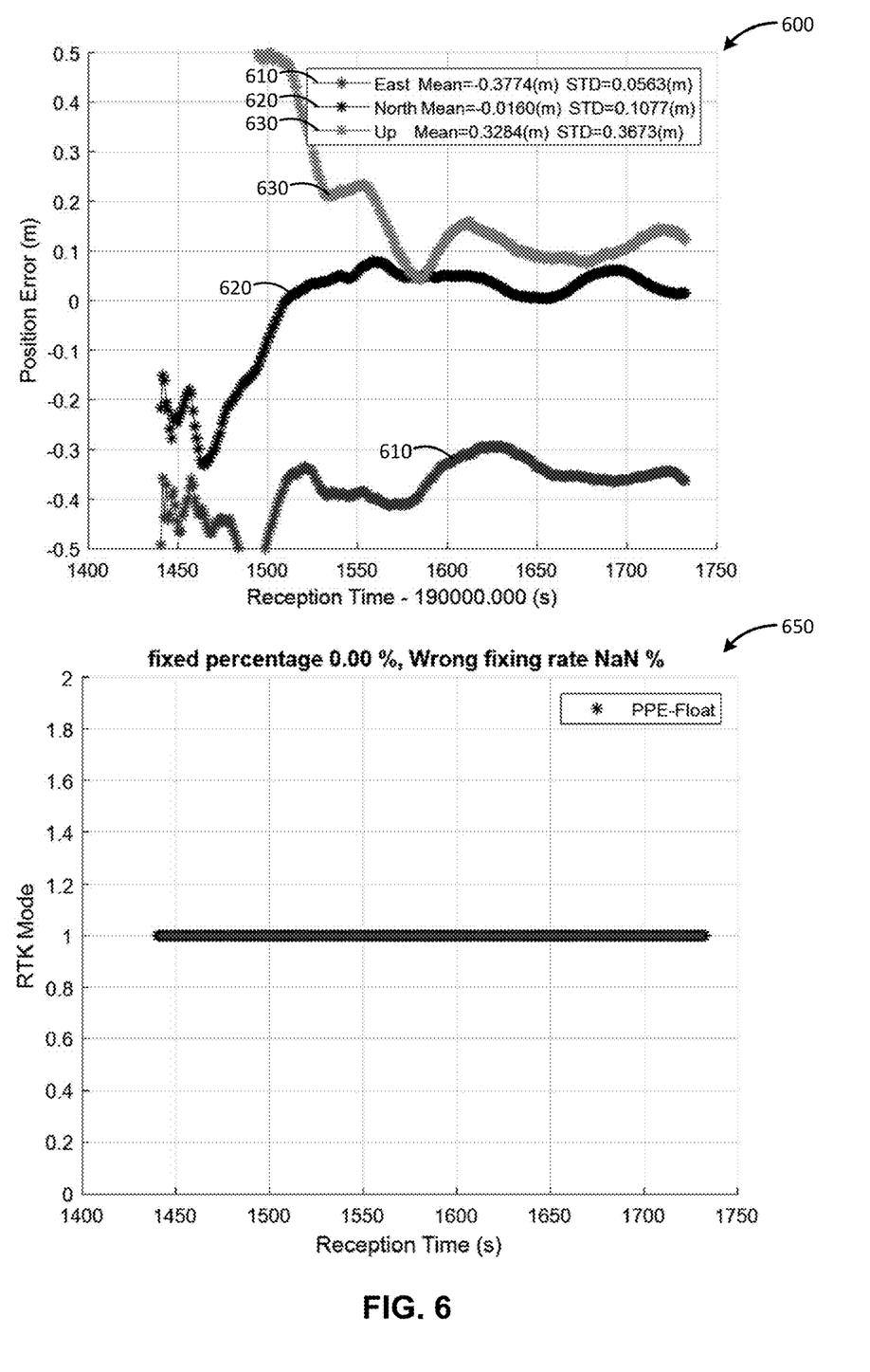
FIG. 6 is an illustration of graphs showing the performance of a first GNSS device utilizing RTK correction data having a cycle offset.
Figure 7:
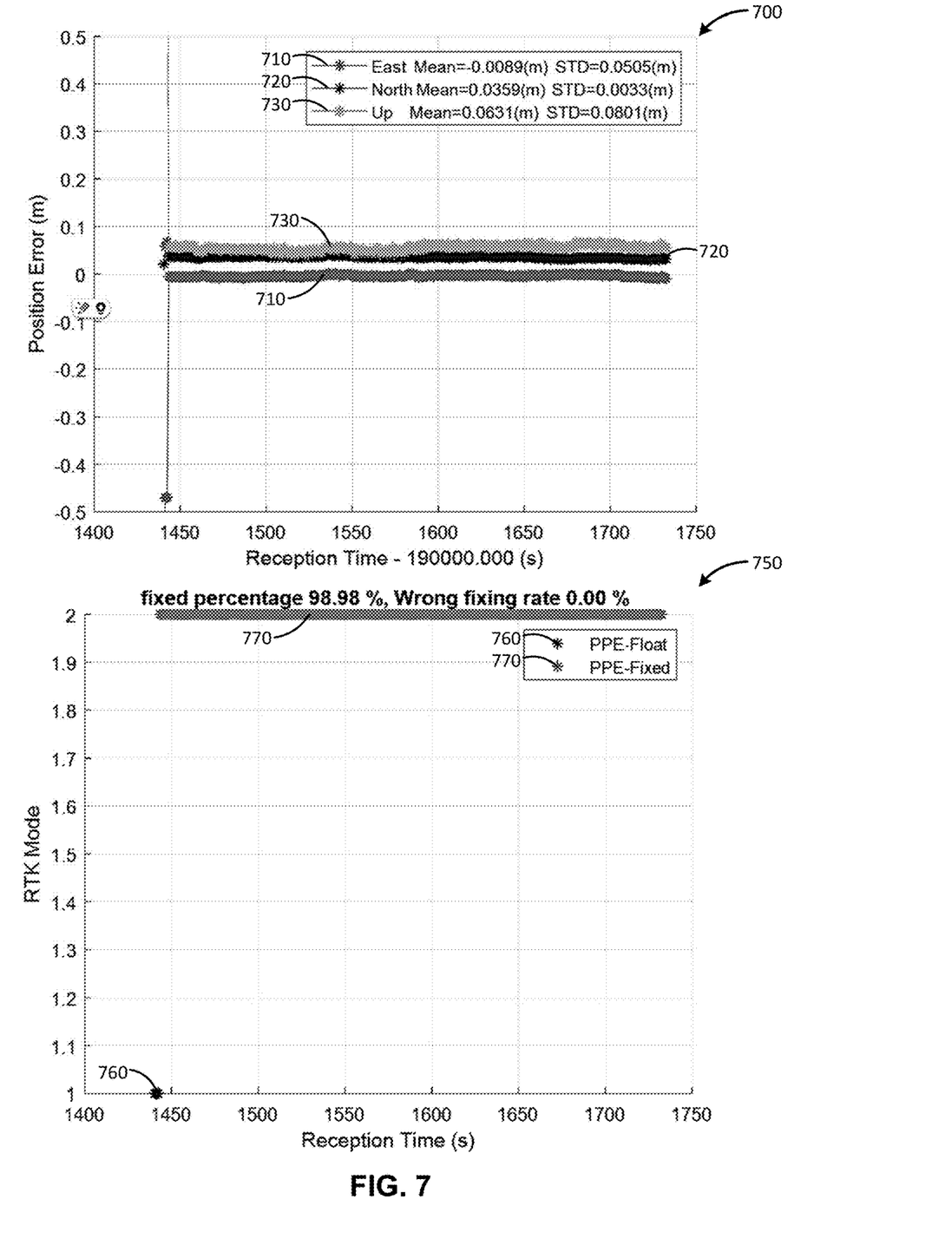
FIG. 7 is an illustration of graphs showing the performance of a second GNSS device utilizing RTK correction data having a cycle offset and identifying and compensating for a PPE correction exception.

As noted, embodiments provided herein can allow for identification of PPE correction exceptions, which can increase the overall performance of high-precision GNSS positioning of a GNSS device. FIGS. 6 and 7, discussed below, provide an example of such performance gain using experimental results.

FIG. 6 is an illustration of graphs showing the performance of a GNSS device utilizing RTK correction data having a cycle offset (e.g., as illustrated in FIG. 3B). First graph 600 plots position error (in meters) for East 610, North 620, and Up 630 coordinates of the GNSS device over a period of time (ranging from approximately 1440 seconds to 1740 seconds). Second graph 650 shows blocks in RTK mode of the GNSS device over the same period of time. As can be seen, RTK mode stays in mode "1" (PPE-Float), and the high-precision position never converges, indicating the PPE never resolves the ambiguity term.

FIG. 7 is an illustration of graphs showing the performance of a GNSS device utilizing the same RTK correction data as the GNSS device in FIG. 6. Here, however, the GNSS device utilizes embodiments herein to identify PPE correction exceptions and determine a positioning estimate without the erroneous correction data. Similar to FIG. 6, first 700 graph 600 plots position error (in meters) for East 710, North 720, and Up 730 coordinates of the GNSS device over a period of time, and second graph 750 shows blocks in RTK mode of the GNSS device over the same period of time. In contrast to FIG. 6, however, the PPE very quickly converges on a solution (as shown by the second graph 750, in which the RTK mode quickly changes from PPE-float 760 to PPE-fixed 770), resulting in a positioning error of less than 1 m in each direction.

FIG. 8 is a block diagram of various hardware and software components of a GNSS device 800, according to an embodiment. These components can be utilized as described herein above (e.g. in association with FIGS. 1-7). For example, the GNSS device 800 can perform the operations of the methods illustrated in FIGS. 2 and 5, and/or one or more of the functions of a GNSS device as described in the embodiments herein. It should be noted that FIG. 8 is meant only to provide a generalized illustration of various components, any or all of which may be utilized as appropriate. As previously noted, GNSS device 800 may vary in form and function, and may ultimately comprise any GNSS-enabled device, including vehicles, commercial and consumer electronic devices, survey equipment, and more.

The GNSS device 800 is shown comprising hardware elements that can be electrically coupled via a bus 805 (or may otherwise be in communication, as appropriate). The hardware elements may include a processor(s) 810 which can include without limitation one or more general-purpose processors, one or more special-purpose processors (such as DSP chips, graphics processors (GPUs), application specific integrated circuits (ASICs), and/or the like), and/or other processor, processing structure, processing unit, or processing means. As shown in FIG. 8, some embodiments may have a separate DSP 820, depending on desired functionality. Location determination and/or other determinations based on wireless communication may be provided in the processor(s) 810 and/or wireless communication interface 830 (discussed below). The GNSS device 800 also can include one or more input devices 870, which can include without limitation a keyboard, touch screen, a touch pad, microphone, button(s), dial(s), switch(es), and/or the like; and one or more output devices 815, which can include without limitation a display, light emitting diode (LED), speakers, and/or the like. As will be appreciated, the type of input devices 870 and output devices 815 may depend on the type of GNSS device 800 with which the input devices 870 and output devices 815 are integrated.

The GNSS device 800 may also include a wireless communication interface 830, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX™ device, a Wide Area Network (WAN) device and/or various cellular devices, etc.), and/or the like, which may enable the GNSS device 800 to communicate via networks and/or directly with other devices as described herein. The wireless communication interface 830 may permit data and signaling to be communicated (e.g. transmitted and received) with a network, for example, via WAN access points, cellular base stations and/or other access node types, and/or other network components, computer systems, and/or any other electronic devices described herein. The communication can be carried out via one or more wireless communication antenna(s) 832 that send and/or receive wireless signals 834. The antenna(s) 832 may comprise one or more discrete antennas, one or more antenna arrays, or any combination.

Depending on desired functionality, the wireless communication interface 830 may comprise separate transceivers, a separate receiver and transmitter, or any combination of transceivers, transmitters, and/or receivers to communicate with base stations and other terrestrial transceivers, such as wireless devices and access points. The GNSS device 800 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX™ (IEEE 802.16) network, and so on. A CDMA network may implement one or more radio access technologies (RATs) such as CDMA2000®, Wideband CDMA (WCDMA), and so on. CDMA2000® includes IS-95, IS-2000, and/or IS-856 standards. A TDMA network may implement Global System for Mobile Communications (GSM), Digital Advanced Mobile Phone System (D-AMPS), or some other RAT. An OFDMA network may employ Long-Term Evolution (LTE), LTE Advanced, 5G NR, 6G, and so on. 5G NR, LTE, LTE Advanced, GSM, and WCDMA are described in documents from the Third Generation Partnership Project (3GPP™). CDMA2000® is described in documents from a consortium named "3rd Generation Partnership Project 2" (3GPP2). 3GPP™ and 3GPP2 documents are publicly available. A wireless local area network (WLAN) may also be an IEEE 802.11x network, and a wireless personal area network (WPAN) may be a Bluetooth® network, an IEEE 802.15x, or some other type of network. The techniques described herein may also be used for any combination of WWAN, WLAN and/or WPAN.

The GNSS device 800 can further include sensor(s) 840. Sensors 840 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to complement and/or facilitate the location determination described herein, in some instances.

Embodiments of the GNSS device 800 may also include a GNSS receiver 880 capable of receiving signals 884 from one or more GNSS satellites (e.g., SVs 140) as described herein using an antenna 882 (which could be the same as antenna 832). The GNSS receiver 880 can extract a position of the GNSS device 800, using conventional techniques, from GNSS SVs of a GNSS system (e.g., SVs 140 of FIG. 3), such as GPS, GAL, Global Navigation Satellite System (GLONASS), Quasi-Zenith Satellite System (QZSS) over Japan, Indian Regional Navigational Satellite System (IRNSS) over India, Beidou Navigation Satellite System (BDS) over China, and/or the like. Moreover, the GNSS receiver 880 can be used with various augmentation systems (e.g., Satellite-based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 880 illustrated in FIG. 8 is illustrated as a component distinct from other components within a GNSS device 800, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 810, DSP 820, and/or a processor within the wireless communication interface 830 (e.g., in a modem). A GNSS receiver may optionally also include a positioning engine, such as those described herein (e.g., a an Kalman filter, WLS, particle filter, etc.), which can use GNSS measurements from the measurement engine and RTK correction information to determine a position of the GNSS receiver. The positioning engine may also be executed by one or more processors, such as processor(s) 810 and/or DSP 820.

The GNSS device 800 may further include and/or be in communication with a memory 860. The memory 860 may comprise a machine- or computer-readable medium, which can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 860 of the GNSS device 800 also can comprise software elements (not shown in FIG. 8), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 860 that are executable by the GNSS device 800 (and/or processor(s) 810 or DSP 820 within GNSS device 800). In an aspect, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device or system is capable of manipulating or transforming signals, typically represented as physical electronic, electrical, or magnetic quantities within memories, registers, or other information storage devices, transmission devices, or display devices of the special purpose computer or similar special purpose electronic computing device or system.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure as defined by the appended claims. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure. In view of this description embodiments may include different combinations of features. Implementation examples are described in the following numbered clauses:

Clause 1: A method of identifying an error in global navigation satellite system (GNSS) correction data for precise positioning of a GNSS device, the method comprising: receiving, at the GNSS device, the GNSS correction data from a correction data source; obtaining, using a multi-band GNSS receiver of the GNSS device: a first carrier-phase measurement of a first GNSS signal having a first carrier frequency, and a second carrier-phase measurement of a second GNSS signal having a second carrier frequency; applying the GNSS correction data to the first carrier-phase measurement, the second carrier-phase measurement, or both; subsequent to applying the GNSS correction data, performing a wide-lane (WL) combination of the first carrier-phase measurement and the second carrier-phase measurement; and determining whether the GNSS correction data includes an error based at least in part on whether a difference between a float ambiguity value for the WL combination and a closest integer exceeds a threshold value.

Clause 2: The method of clause 1, further comprising, responsive to determining that the GNSS correction data includes the error, determining a precise GNSS position estimate of the GNSS device without using the GNSS correction data to for ambiguity resolution.

Clause 3: The method of any one of clause 2 further comprising outputting the precise GNSS position estimate of the GNSS device to an application, an operation system, a component of the GNSS device, a second device, or any combination thereof.

Clause 4: The method of any one of clauses 1-3 further comprising determining the float ambiguity value for the WL combination, wherein determining the float ambiguity value for the WL combination comprises solving a geometry component of the WL combination.

Clause 5: The method of any one of clauses 1-4 further comprising determining the float ambiguity value for the WL combination, wherein determining the float ambiguity value for the WL combination comprises taking a difference between a carrier phase value of the WL combination and a narrow-lane (NL) pseudorange value.

Clause 6: The method of any one of clauses 1-5 wherein the WL combination comprises an ultra-wide lane (UWL) combination in which an effective wavelength of the UWL combination is greater than 3 m.

Clause 7: The method of any one of clauses 1-6 wherein the GNSS correction data comprises real-time kinematic (RTK) or precise point positioning (PPP) correction data.

Clause 8: The method of any one of clauses 1-7 wherein threshold value is 0.25 or less.

Clause 9: A global navigation satellite system (GNSS) device comprising: a multi-band GNSS receiver; one or more memories; and one or more processors communicatively coupled with the multi-band GNSS receiver and the one or more memories, wherein the one or more processors are configured to: receive GNSS correction data from a correction data source; obtain, using the multi-band GNSS receiver: a first carrier-phase measurement of a first GNSS signal having a first carrier frequency, and a second carrier-phase measurement of a second GNSS signal having a second carrier frequency; apply the GNSS correction data to the first carrier-phase measurement, the second carrier-phase measurement, or both; subsequent to applying the GNSS correction data, perform a wide-lane (WL) combination of the first carrier-phase measurement and the second carrier-phase measurement; and determine whether the GNSS correction data includes an error based at least in part on whether a difference between a float ambiguity value for the WL combination and a closest integer exceeds a threshold value.

Clause 10: The GNSS device of clause 9, wherein the one or more processors are further configured to, responsive to determining that the GNSS correction data includes the error, determine a precise GNSS position estimate of the GNSS device without using the GNSS correction data to for ambiguity resolution.

Clause 11: The GNSS device of clause 10 wherein the one or more processors are further configured to output the precise GNSS position estimate of the GNSS device to an application, an operation system, a component of the GNSS device, a second device, or any combination thereof.

Clause 12: The GNSS device of any one of clauses 9-11 wherein the one or more processors are further configured to determine the float ambiguity value for the WL combination, wherein determining the float ambiguity value for the WL combination comprises solving a geometry component of the WL combination.

Clause 13: The GNSS device of any one of clauses 9-12 wherein the one or more processors are further configured to determine the float ambiguity value for the WL combination, wherein determining the float ambiguity value for the WL combination comprises taking a difference between a carrier phase value of the WL combination and a narrow-lane (NL) pseudorange value.

Clause 14: The GNSS device of any one of clauses 9-13 wherein the WL combination comprises an ultra-wide lane (UWL) combination in which an effective wavelength of the UWL combination is greater than 3 m.

Clause 15: The GNSS device of any one of clauses 9-14 wherein, to receive the GNSS correction data, the one or more processors are configured to receive real-time kinematic (RTK) or precise point positioning (PPP) correction data.

Clause 16: The GNSS device of any one of clauses 9-15 wherein threshold value is 0.25 or less.

Clause 17: An apparatus for identifying an error in global navigation satellite system (GNSS) correction data for precise positioning of a GNSS device, the apparatus comprising: means for receiving the GNSS correction data from a correction data source; means for obtaining: a first carrier-phase measurement of a first GNSS signal having a first carrier frequency, and a second carrier-phase measurement of a second GNSS signal having a second carrier frequency; means for applying the GNSS correction data to the first carrier-phase measurement, the second carrier-phase measurement, or both; subsequent to applying the GNSS correction data, performing a wide-lane (WL) combination of the first carrier-phase measurement and the second carrier-phase measurement; and means for determining whether the GNSS correction data includes an error based at least in part on whether a difference between a float ambiguity value for the WL combination and a closest integer exceeds a threshold value.

Clause 18: The apparatus of clause 17, further comprising means for determining, responsive to determining that the GNSS correction data includes the error, a precise GNSS position estimate of the GNSS device without using the GNSS correction data to for ambiguity resolution.

Clause 19: The apparatus of clause 18 further comprising means for outputting the precise GNSS position estimate of the GNSS device to an application, an operation system, a component of the GNSS device, a second device, or any combination thereof.

Clause 20: The apparatus of any one of clauses 17-19 further comprising means for determining the float ambiguity value for the WL combination, wherein determining the float ambiguity value for the WL combination comprises solving a geometry component of the WL combination.

Clause 21: The apparatus of any one of clauses 17-20 further comprising means for determining the float ambiguity value for the WL combination, wherein determining the float ambiguity value for the WL combination comprises taking a difference between a carrier phase value of the WL combination and a narrow-lane (NL) pseudorange value.

Clause 22: The apparatus of any one of clauses 17-21 wherein the WL combination comprises an ultra-wide lane (UWL) combination in which an effective wavelength of the UWL combination is greater than 3 m.

Clause 23: The apparatus of any one of clauses 17-22 wherein the means for receiving GNSS correction data comprises means for receiving real-time kinematic (RTK) or precise point positioning (PPP) correction data.

Clause 24: The apparatus of any one of clauses 17-23 wherein threshold value is 0.25 or less.

Clause 25: A non-transitory computer-readable medium storing instructions for identifying an error in global navigation satellite system (GNSS) correction data for precise positioning of a GNSS device, the instructions comprising code for: receiving, at the GNSS device, the GNSS correction data from a correction data source; obtaining, using a multi-band GNSS receiver of the GNSS device: a first carrier-phase measurement of a first GNSS signal having a first carrier frequency, and a second carrier-phase measurement of a second GNSS signal having a second carrier frequency; applying the GNSS correction data to the first carrier-phase measurement, the second carrier-phase measurement, or both; subsequent to applying the GNSS correction data, performing a wide-lane (WL) combination of the first carrier-phase measurement and the second carrier-phase measurement; and determining whether the GNSS correction data includes an error based at least in part on whether a difference between a float ambiguity value for the WL combination and a closest integer exceeds a threshold value.

Clause 26: The computer-readable medium of clause 25, wherein the instructions further comprise code for, responsive to determining that the GNSS correction data includes the error, determining a precise GNSS position estimate of the GNSS device without using the GNSS correction data to for ambiguity resolution.

Clause 27: The computer-readable medium of clause 26 wherein the instructions further comprise code for outputting the precise GNSS position estimate of the GNSS device to an application, an operation system, a component of the GNSS device, a second device, or any combination thereof.

Clause 28: The computer-readable medium of any one of clauses 25-27 wherein the instructions further comprise code for determining the float ambiguity value for the WL combination, wherein determining the float ambiguity value for the WL combination comprises solving a geometry component of the WL combination.

Clause 29: The computer-readable medium of any one of clauses 25-28 wherein the instructions further comprise code for determining the float ambiguity value for the WL combination, wherein determining the float ambiguity value for the WL combination comprises taking a difference between a carrier phase value of the WL combination and a narrow-lane (NL) pseudorange value.

Clause 30: The computer-readable medium of any one of clauses 25-29 wherein the WL combination comprises an ultra-wide lane (UWL) combination in which an effective wavelength of the UWL combination is greater than 3 m.

What is claimed is:

1. A method of identifying an error in global navigation satellite system (GNSS) correction data for precise positioning of a GNSS device, the method comprising:
    receiving, at the GNSS device, the GNSS correction data from a correction data source;
    obtaining, using a multi-band GNSS receiver of the GNSS device:
        a first carrier-phase measurement of a first GNSS signal having a first carrier frequency, and
        a second carrier-phase measurement of a second GNSS signal having a second carrier frequency;
    applying the GNSS correction data to the first carrier-phase measurement, the second carrier-phase measurement, or both;
    subsequent to applying the GNSS correction data, performing a wide-lane (WL) combination of the first carrier-phase measurement and the second carrier-phase measurement; and
    determining whether the GNSS correction data includes an error based at least in part on whether a difference between a float ambiguity value for the WL combination and a closest integer exceeds a threshold value.

2. The method of claim 1, further comprising, responsive to determining that the GNSS correction data includes the error, determining a precise GNSS position estimate of the GNSS device without using the GNSS correction data to for ambiguity resolution.

3. The method of claim 2, further comprising outputting the precise GNSS position estimate of the GNSS device to an application, an operation system, a component of the GNSS device, a second device, or any combination thereof.

4. The method of claim 1, further comprising determining the float ambiguity value for the WL combination, wherein determining the float ambiguity value for the WL combination comprises solving a geometry component of the WL combination.

5. The method of claim 1, further comprising determining the float ambiguity value for the WL combination, wherein determining the float ambiguity value for the WL combination comprises taking a difference between a carrier phase value of the WL combination and a narrow-lane (NL) pseudorange value.

6. The method of claim 1, wherein the WL combination comprises an ultra-wide lane (UWL) combination in which an effective wavelength of the UWL combination is greater than 3 m.

7. The method of claim 1, wherein the GNSS correction data comprises real-time kinematic (RTK) or precise point positioning (PPP) correction data.

8. The method of claim 1, wherein threshold value is 0.25 or less.

9. A global navigation satellite system (GNSS) device comprising:
   a multi-band GNSS receiver;
   one or more memories; and
   one or more processors communicatively coupled with the multi-band GNSS receiver and the one or more memories, wherein the one or more processors are configured to:
      receive GNSS correction data from a correction data source;
      obtain, using the multi-band GNSS receiver:
         a first carrier-phase measurement of a first GNSS signal having a first carrier frequency, and
         a second carrier-phase measurement of a second GNSS signal having a second carrier frequency;
      apply the GNSS correction data to the first carrier-phase measurement, the second carrier-phase measurement, or both;
      subsequent to applying the GNSS correction data, perform a wide-lane (WL) combination of the first carrier-phase measurement and the second carrier-phase measurement; and
      determine whether the GNSS correction data includes an error based at least in part on whether a difference between a float ambiguity value for the WL combination and a closest integer exceeds a threshold value.

10. The GNSS device of claim 9, wherein the one or more processors are further configured to, responsive to determining that the GNSS correction data includes the error, determine a precise GNSS position estimate of the GNSS device without using the GNSS correction data to for ambiguity resolution.

11. The GNSS device of claim 10, wherein the one or more processors are further configured to output the precise GNSS position estimate of the GNSS device to an application, an operation system, a component of the GNSS device, a second device, or any combination thereof.

12. The GNSS device of claim 9, wherein the one or more processors are further configured to determine the float ambiguity value for the WL combination, wherein determining the float ambiguity value for the WL combination comprises solving a geometry component of the WL combination.

13. The GNSS device of claim 9, wherein the one or more processors are further configured to determine the float ambiguity value for the WL combination, wherein determining the float ambiguity value for the WL combination comprises taking a difference between a carrier phase value of the WL combination and a narrow-lane (NL) pseudorange value.

14. The GNSS device of claim 9, wherein the WL combination comprises an ultra-wide lane (UWL) combination in which an effective wavelength of the UWL combination is greater than 3 m.

15. The GNSS device of claim 9, wherein, to receive the GNSS correction data, the one or more processors are configured to receive real-time kinematic (RTK) or precise point positioning (PPP) correction data.

16. The GNSS device of claim 9, wherein threshold value is 0.25 or less.

17. An apparatus for identifying an error in global navigation satellite system (GNSS) correction data for precise positioning of a GNSS device, the apparatus comprising:
   means for receiving the GNSS correction data from a correction data source;
   means for obtaining:
      a first carrier-phase measurement of a first GNSS signal having a first carrier frequency, and
      a second carrier-phase measurement of a second GNSS signal having a second carrier frequency;
   means for applying the GNSS correction data to the first carrier-phase measurement, the second carrier-phase measurement, or both;
   subsequent to applying the GNSS correction data, performing a wide-lane (WL) combination of the first carrier-phase measurement and the second carrier-phase measurement; and
   means for determining whether the GNSS correction data includes an error based at least in part on whether a difference between a float ambiguity value for the WL combination and a closest integer exceeds a threshold value.

18. The apparatus of claim 17, further comprising means for determining, responsive to determining that the GNSS correction data includes the error, a precise GNSS position estimate of the GNSS device without using the GNSS correction data to for ambiguity resolution.

19. The apparatus of claim 18, further comprising means for outputting the precise GNSS position estimate of the GNSS device to an application, an operation system, a component of the GNSS device, a second device, or any combination thereof.

20. The apparatus of claim 17, further comprising means for determining the float ambiguity value for the WL combination, wherein determining the float ambiguity value for the WL combination comprises solving a geometry component of the WL combination.

21. The apparatus of claim 17, further comprising means for determining the float ambiguity value for the WL combination, wherein determining the float ambiguity value for the WL combination comprises taking a difference between a carrier phase value of the WL combination and a narrow-lane (NL) pseudorange value.

22. The apparatus of claim 17, wherein the WL combination comprises an ultra-wide lane (UWL) combination in which an effective wavelength of the UWL combination is greater than 3 m.

23. The apparatus of claim 17, wherein the means for receiving GNSS correction data comprises means for receiving real-time kinematic (RTK) or precise point positioning (PPP) correction data.

24. The apparatus of claim 17, wherein threshold value is 0.25 or less.

25. A non-transitory computer-readable medium storing instructions for identifying an error in global navigation satellite system (GNSS) correction data for precise positioning of a GNSS device, the instructions comprising code for:
receiving, at the GNSS device, the GNSS correction data from a correction data source;
obtaining, using a multi-band GNSS receiver of the GNSS device:
a first carrier-phase measurement of a first GNSS signal having a first carrier frequency, and
a second carrier-phase measurement of a second GNSS signal having a second carrier frequency;
applying the GNSS correction data to the first carrier-phase measurement, the second carrier-phase measurement, or both;
subsequent to applying the GNSS correction data, performing a wide-lane (WL) combination of the first carrier-phase measurement and the second carrier-phase measurement; and
determining whether the GNSS correction data includes an error based at least in part on whether a difference between a float ambiguity value for the WL combination and a closest integer exceeds a threshold value.

26. The computer-readable medium of claim 25, wherein the instructions further comprise code for, responsive to determining that the GNSS correction data includes the error, determining a precise GNSS position estimate of the GNSS device without using the GNSS correction data to for ambiguity resolution.

27. The computer-readable medium of claim 26, wherein the instructions further comprise code for outputting the precise GNSS position estimate of the GNSS device to an application, an operation system, a component of the GNSS device, a second device, or any combination thereof.

28. The computer-readable medium of claim 25, wherein the instructions further comprise code for determining the float ambiguity value for the WL combination, wherein determining the float ambiguity value for the WL combination comprises solving a geometry component of the WL combination.

29. The computer-readable medium of claim 25, wherein the instructions further comprise code for determining the float ambiguity value for the WL combination, wherein determining the float ambiguity value for the WL combination comprises taking a difference between a carrier phase value of the WL combination and a narrow-lane (NL) pseudorange value.

30. The computer-readable medium of claim 25, wherein the WL combination comprises an ultra-wide lane (UWL) combination in which an effective wavelength of the UWL combination is greater than 3 m.

* * * * *